No. 694,404. Patented Mar. 4, 1902.
J. MOORE.
MACHINE FOR HANDLING BARBED WIRE.
(Application filed Dec. 30, 1899.)
(No Model.)
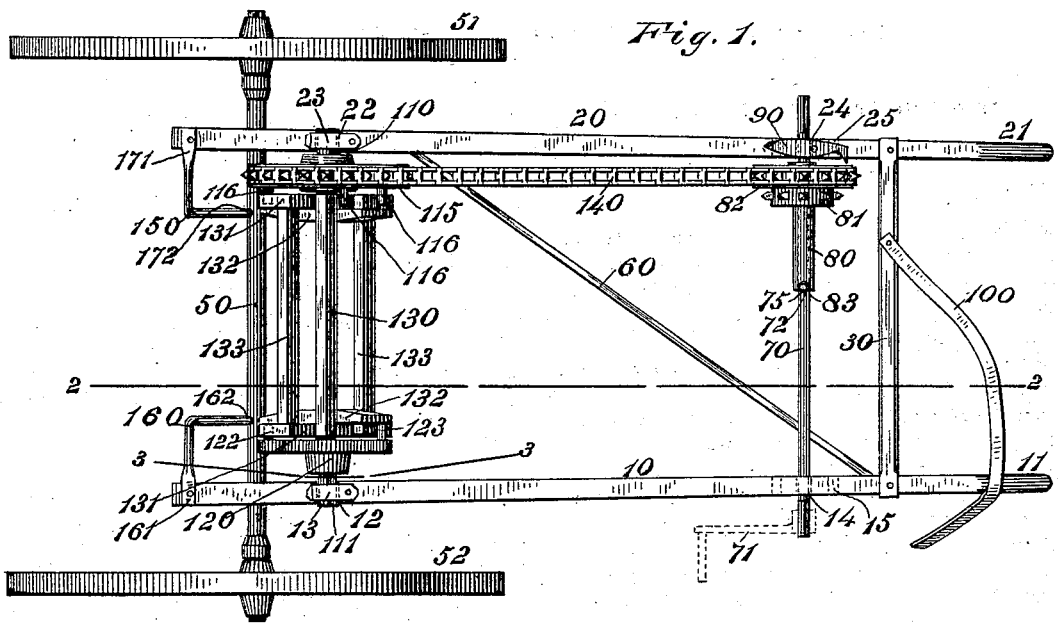
Fig. 1.
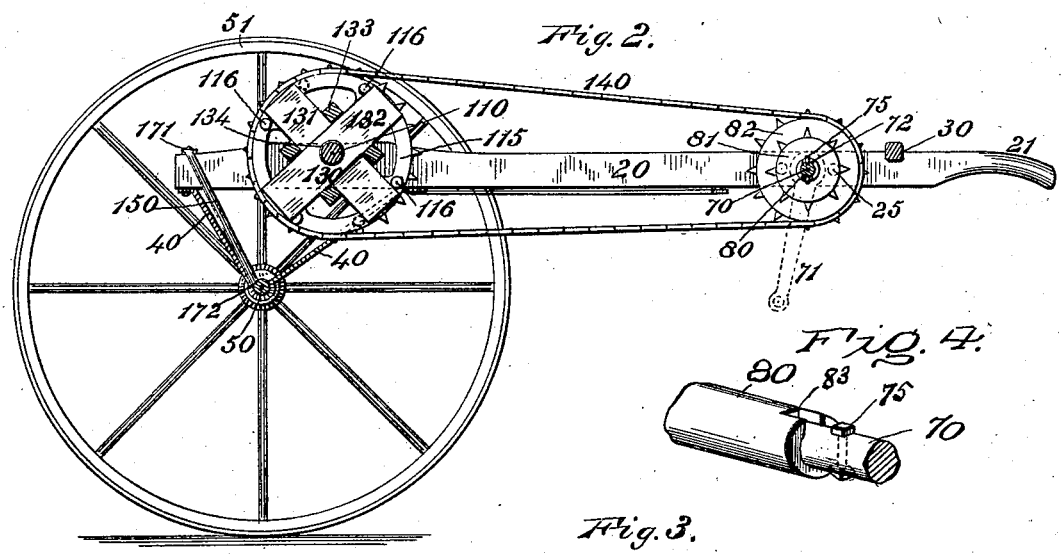
Fig. 2.
Fig. 4.
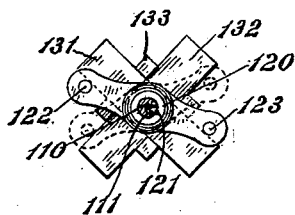
Fig. 3.
WITNESSES:
Harry King
S. M. McColl
INVENTOR
James Moore,
BY F. C. Somes
ATTORNEY

UNITED STATES PATENT OFFICE.

JAMES MOORE, OF HANOVER, ILLINOIS.

MACHINE FOR HANDLING BARBED WIRE.

SPECIFICATION forming part of Letters Patent No. 694,404, dated March 4, 1902.

Application filed December 30, 1899. Serial No. 742,168. (No model.)

*To all whom it may concern:*

Be it known that I, JAMES MOORE, a citizen of the United States of America, residing at Hanover, in the county of Jo Daviess, in the State of Illinois, have invented certain new and useful Improvements in Fence-Wiring Machines, of which the following is a specification.

This invention relates to a machine for winding or unwinding wire upon or from a reel, which may be readily carried from place to place, upon which the reels may be readily changed, and which may be used as a wire stretcher or tightener.

In the accompanying drawings, Figure 1 represents a plan view of this improved reel-carrier and wire-stretcher. Fig. 2 represents a vertical section taken on line 2 2 of Fig. 1. Fig. 3 represents a section taken on line 3 3 of Fig. 1, showing an end view of the reel and the means for holding it in position on the spindle.

The same reference-numbers indicate the same parts in all the figures.

The frame of this improved reel-carriage preferably comprises two longitudinal bars 10 and 20, having handles 11 and 21 formed at their front ends and connected by a cross bar or brace 30. These bars 10 and 20 are connected with and supported above the axle 50 by supporting-irons, as 40, secured thereto and fixed to the axle. A diagonal brace, preferably in the form of a rod 60, extends from the front end of the bar 10 to a point near the rear of the bar 20 and tends to strengthen the frame. These bars 10 and 20 are preferably enlarged toward their rear ends and provided with recesses 12 and 22, adapted to receive the reel-spindle, hereinafter described. Buttons 13 and 23 are pivoted at one side of these recesses and adapted to swing over them and hold the reel-spindle in position in the frame. The bars 10 and 20 are further provided near their front ends with a series of perforations, as 14 and 15 and 24 and 25, adapted to serve as bearings for a crank-shaft 70. This shaft 70 extends through the perforations and is squared on its opposite ends to receive a crank-handle 71. This handle is made removable and may be used on either end of the crank-shaft 70, as desired. A sleeve 80, having sprocket-wheels 81 and 82 of different sizes, preferably cast integral therewith, is adapted to slide on the crank-shaft 70. This sleeve is also provided with a slot 83, adapted to receive a clamping-bolt 75, which projects into a hole 72 in the crank-shaft 70 and holds the sleeve in adjusted position on the shaft. The bar 20 is provided on its upper face at a point above the crank-shaft with a dog 90, adapted to engage the sprocket-wheel 82 and lock the sleeve against rotation. A brake-strap 100 is attached to the cross-brace 30 and is adapted to pass around the sleeve 80 and regulate the speed at which the wire is unwound. A spool or reel spindle 110, having a longitudinal groove 111 at one end and a sprocket-wheel 115 at the other end, is adapted to turn in bearings in the bars 10 and 20. These bearings are formed by the combination of the recesses 12 and 22 with the buttons 13 and 23 shutting over them. This sprocket-wheel 115 is preferably made integral with the spindle 110 and is provided on its inner face with lateral studs, as 116, which are adapted to engage the end pieces of one end of a wire spool or reel hereinafter described. A locking bar or yoke 120 is adapted to slide on the grooved end of the spindle 110 and is provided with a spline 121, which fits in the groove 111 and keys the yoke to the spindle. This yoke is also provided on its inner face with lateral studs 122 and 123, which are adapted to engage the wire-spool and together with the studs on the spocket-wheel 115 holds the spool in position and causes it to rotate with the spindle. A wire reel or spool 130 of any suitable construction is adapted to slide on the spindle 110. As shown, this spool 130 is formed of two cross-pieces, as 131 and 132, on each end, connected by longitudinal bars or rods, as 133, preferably four in number. The ends of this spool are provided with holes, as 134, through which the spindle 110 passes. An endless sprocket-chain 140 passes over the sprocket-wheel 115 on the reel-spindle 110 and connects it with either of the sprocket-wheels 81 or 82 on the crank-shaft, as desired.

The frame above described is preferably mounted on wheels, and in the form illustrated it is supported on the axle 50, having wheels 51 and 52 of any suitable construction, by the brace or supports, as 40. These supporting-irons 40 are preferably approximately V-shaped and are attached at their opposite ends to the rear ends of the bars 10 and 20. The apices of these supports surround and engage the axle 50.

A device for guiding the wire in winding and unwinding it from the reel preferably comprises two rods 150 and 160, preferably bent at right angles and having their upper ends 161 and 171 secured to the bars 10 and 20, respectively, and their lower ends 162 and 172 attached to the axle 50 at points opposite the ends of the reel.

In preparing the machine ready for use the buttons 13 and 23 are swung back from the recesses 11 and 12, the spindle 110 is lifted from said recesses, the yoke 120 removed from the spindle, and a reel or spool 130, filled with wire, is slipped onto the spindle and fastened in place by the yoke 120. The spindle is then replaced in the recesses, the buttons swung over the ends thereof, and the machine is ready for work.

To unwind the wire from the reel, the pin 75 is withdrawn from the shaft and the sleeve 80, with its sprocket-wheels 81 and 82, is free to turn on the shaft 70, and all that is then necessary is to pull the machine along without turning the crank-handle.

In the use of this machine for building a fence one end of the wire is secured to a fence-post, the carriage is drawn along the fence the desired distance, and is then anchored to a post or any convenient article. This moving of the carriage unwinds the wire as described in the foregoing paragraph. Then the chain 140 is passed over the small sprocket-wheel 81 and the sleeve 80 keyed to the shaft by passing the pin 75 through the slot in the sleeve 80 and the hole in the shaft 70. The shaft 70 is then placed in the holes 15 and 25 near the front end of the bars 10 and 20 and the crank-shaft turned until the desired tautness of the wire is obtained. The reel is then locked against rotation by throwing the dog 90 into engagement with the sprocket-wheel 82, where it is held until the wire has been fastened to the second post by a staple or otherwise.

By using a small sprocket-wheel in the stretching operation a low gear is obtained, which avoids the necessity of exerting a great amount of strength in stretching the wire.

For winding the wire onto the reel without stretching, as in removing or tearing down a wire fence, the sprocket-chain 140 is shifted onto the larger sprocket-wheel 82 and the crank-shaft 70 is placed in the holes 14 and 24 of the bars 10 and 20, the sleeve 80 is keyed to the shaft, and on turning the crank-handle the wire is wound on the reel.

The sleeve 80, with its integral sprocket-wheels 81 and 82 of different sizes, serves a triple purpose—to wit, it is used to change the gear of the sprocket mechanism from a high to a low gear and the reverse, it may act with or independently of the crank-shaft, and the sprocket-wheel 82 serves as a rack for engagement by the dog 90 to lock the reel-spindle against rotation.

I claim as my invention—

The combination of a frame having a series of holes therein, a spool-spindle supported in said frame, a sprocket-wheel disposed on said spool-spindle, a crank-shaft adapted to be journaled in said holes, a plurality of integral sprocket-wheels of varying sizes provided with a sleeve adapted to slide on said crank-shaft, means for fastening said sleeve to said crank-shaft and a chain connecting the spool-spindle sprocket-wheels with the crank-shaft sprocket-wheel.

In testimony whereof I have signed my name to this specification in the presence of two subscribing witnesses.

JAMES MOORE.

Witnesses:
 JAMES C. NEWKIRK,
 JOHN S. EDWARDS.